Patented Oct. 15, 1935

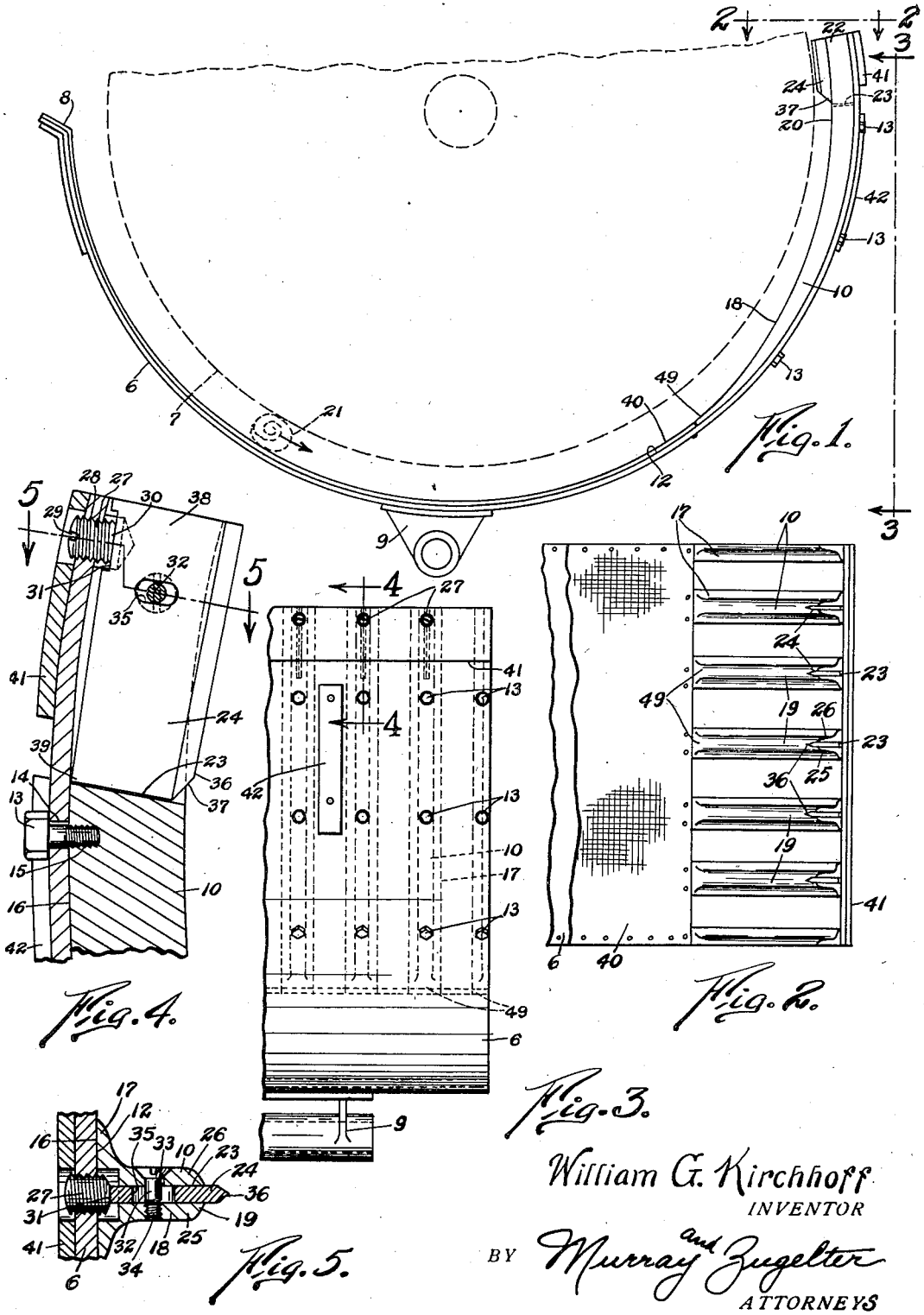

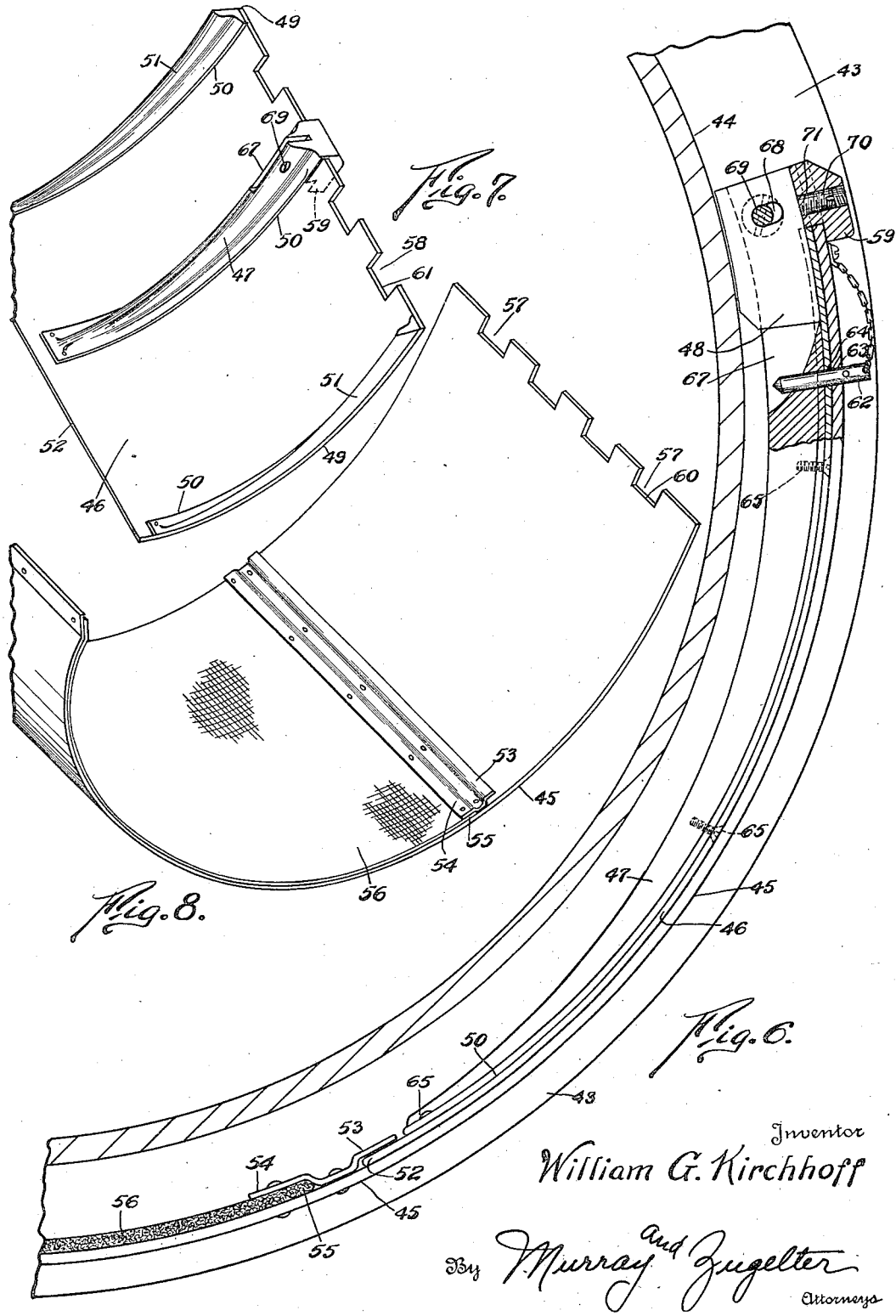

2,017,281

REISSUED

UNITED STATES PATENT OFFICE 2,017,281

LOAF CREASING AND CUTTING MEANS FOR DOUGH MOLDERS

William G. Kirchhoff, Cincinnati, Ohio, assignor to The J. H. Day Company, Cincinnati, Ohio, a corporation of Ohio Application February 23, 1933, Serial No. 658,012

17 Claims. (Cl. 107—9)

This invention relates to improved means for use in connection with dough molders or the like, for creasing or grooving a cylindrical molded mass and subsequently cutting same transversely into two or more short sections.

An object of the invention is to provide in a device of the above stated character, improved creasing and cutting means that function in a superior manner to divide loaves with a minimum of skin rupture of the loaf.

Another object of the invention is to provide improved means for creasing and dividing plastic rolls or cylinders, whereby an ordinary or standard molder readily may be converted into a special molder, without altering the standard machine.

A further object is to provide simple and inexpensive means for accomplishing the above objects.

The foregoing and other objects are attained by means described herein and disclosed in the accompanying drawings, in which:

Fig. 1 is a side elevational view of a pressure board embodying the invention, showing its relationship to a molder drum.

Fig. 2 is a fragmental plan view taken on line 2—2 of Fig. 1.

Fig. 3 is a fragmental elevational view taken on line 3—3 of Fig. 1.

Fig. 4 is an enlarged cross-sectional view taken on line 4—4 of Fig. 3.

Fig. 5 is a cross-sectional view taken on line 5—5 of Fig. 4.

Fig. 6 is a view, partly in longitudinal cross-section, showing a modification of the invention.

Figs. 7 and 8 are perspective views showing complementary parts of an improved pressure board of Fig. 6.

In the molding of plastic dough masses it is sometimes desirable to divide the elongated cylindrical molded mass into two or more lengths to provide shorter loaves or sections which may be placed into the bake pans in various positions, or to divide the elongated mass into a sufficient number of short sections as will provide buns, biscuits, or the like. Such dividing of the molded mass is effected by means of a multi-ribbed pressure board which is so equipped that it will automatically measure off and divide the mass into predetermined lengths. Although pressure boards for accomplishing the foregoing described dividing of loaves have been made and used heretofore, they have not been developed to the extent that the finished product formed thereby satisfied the requirements of a properly severed length of dough.

In accordance with the present invention, the cutting or dividing of the mass into predetermined lengths is accomplished practically without rupture or bleeding of the ends resulting from dividing molded lengths of dough. The means of the invention, furthermore, is properly designed so that a standard dough molding machine may be employed to produce a plurality of the loaves or sections by the mere substitution of one type of pressure board for another in an existing drum type molder.

In the drawings, 6 indicates a curved pressure board associated with the drum 7 of a dough molder in the well known manner. The pressure board and the curved outer surface of the drum are mounted in substantially uniformly spaced relationship in accordance with the common practice, the place of entry of loaves being indicated at 8. The pressure board includes one or more brackets 9 which serve to suport the board in position upon a dough molder frame (not shown).

The characters 10 indicate a series of spaced parallel ribs or creasing elements which may be fixed to the inner curved surface 12 of the pressure board by the use of any suitable means such as bolts, screws or the like 13. These securing elements preferably pass through the openings 14 provided in the pressure board, and they threadedly engage threaded bores 15 provided in the backs 16 of the ribs.

As is most clearly indicated in Fig. 5, each rib 10 is constituted of a base portion 17 which abuts the inner surface 12 of the pressure board, and extending from said base portion is the creasing or grooving portion 18. Attention is directed to the fact that the creasing portion is devoid of sharp corners, said portion being decidedly rounded as at 19 along substantially the entire length of the rib. The purpose of the rounded top edge 19 is to preclude the possibility of rupturing or cutting the skin of the molded piece during the entire creasing or grooving operation, so that the fine and even grain or texture of the molded substance will not be injuriously affected prior to ejection of the divided masses.

As is readily apparent from an examination of Fig. 1 the ribbing or ribs are gradually tapered so that the height of the creasing portion 18 gradually increases from the lower end 49 to a point 20 adjacent to the upper end of each rib.

Thus, a molded and elongated mass of dough 21 travelling in the direction indicated, will move toward and between the series of spaced ribs, and said ribs will impress grooves or creases into the elongated mass as it is advanced toward the discharge port 22.

Referring now to Figs. 4 and 5, it will be observed that each rib or creasing element has a portion of its upper end cut or milled out so as to provide a channel 23 for reception of a sharpened cutting element 24, which may be a blade of metal or any other suitable material. The channel or slot 23 preferably is formed at right angles to the base portion 17 and includes part of the creasing element 18, whereby to provide the spaced parallel walls 25 and 26 which serve to support the cutting element therebetween.

Means are provided for adjusting the blade member or cutting element to various positions of extension from the slot or channel 23, and said means may comprise a screw 27 which is threaded into the material of the pressure board as indicated at 28. The head end of the screw is advantageously provided with a slot or any other suitable means 29 for reception of a tool for effecting rotation of the adjusting screw. The innermost end 30 of the screw is adapted to abut a surface or seat 31 provided by the cutting element.

The spaced walls 25 and 26 of that portion of the rib which supports the cutting element (see Fig. 5) preferably are provided with suitable means for clamping the cutting element in adjusted positions as determined by the adjusting screw 27. A simple form of clamping means may consist of a screw or the like 32 which is freely received in an opening or perforation 33 of the wall 26, the threaded end 34 of the screw being in threaded engagement with an aligned threaded opening in the opposite wall 25. The head of the screw 32 preferably is countersunk into the material of the rim, as shown. In order that the blade or cutting element may have limited movement within the slot 23, said blade is provided with an elongated perforation 35 for reception of the locking screw 32. The cutting edge 36 of the blade element preferably is provided at its forward end with a sharpened inclination 37 which facilitates entry of the sharpened edge into the creased or grooved area of the partly divided mass. As is clearly illustrated in Fig. 4, the tail end 38 of the blade may be extended toward the molder drum by merely actuating the adjusting screw 27 while the locking screw 32 is in a slightly tightened condition, while the back 39 of the head end of the blade may rest upon the inner face of the pressure board.

It is to be noted that the pressure board, in order to be equipped with the creasing and cutting unit above described need not be slotted or otherwise cut to such an extent as would result in weakening the discharge end of the pressure board. All parts of the creasing and cutting mechanism are supported directly by the pressure board and may, in effect, be considered part of the pressure board, so that a standard dough molder may be equipped in accordance with this invention by the mere substitution of the improved pressure board structure for that which was originally applied to the molder.

When it is desired to replace the cutting element 24 with a new or reconditioned one, or one of a different size, it is necessary only to remove the locking screw 32 and retract the adjusting screw 27 sufficiently to permit lifting of the cutting element from the slot.

That portion of the pressure board which performs to mold the mass 21 into cylindrical form may or may not be covered with a sheet 40 of canvas or other suitable material capable of precluding sticking of the mass to the inner surface of the pressure board. The elements 41 and 42 indicate strengthening and supporting members for the pressure board, which form no part of the present invention.

In the modification illustrated by Figs. 6, 7, and 8, 43 and 44 indicate, respectively, one side flange and the convex rolling surface of a dough molder drum, adjacent to which is supported a pressure board 45 with a separable creasing and dividing unit attached thereto. Said unit preferably consists of a plate 46, having a curvature corresponding to that of the pressure board 45, and having fixed to its concave face a series of creasing ribs 47 each of which includes an adjustable blade 48 similar to the blade 24 of Figs. 4 and 5. It is to be noted particularly that each of the opposite side edges 49 of the curved plate is bounded by a half rib 51, that is, a rib which is bisected by a plane extending longitudinally of the rib at right angles to its base 50. The purpose of this side rib construction is to protect the loaf ends from the tearing or skin rupturing action of the drum side flanges. It is to be understood that this invention contemplates the provision of any number of ribs such as 47 between the bounding or side rib elements 51.

As will be readily apparent, some form of means is needed to detachably secure the ribbed plate 46 to the pressure board 45 in such a manner that the ribbed plate 46 might easily be removed bodily and replaced with another one having fewer or more ribs, if desired. One form of such means is illustrated, although various types of securing devices readily manifest themselves to the constructor. In accordance with the disclosure, the plate 46 has a lower free end 52 adapted to fit beneath a suitable abutting or retaining flange 53 carried by the concave face of the pressure board. The flange may be provided by a properly shaped strip disposed transversely of the pressure board, and said strip may be further provided with a second flange 54, also spaced slightly from the pressure board, to receive and cover the lower edge 55 of a fabric or like covering means 56 for that portion of the pressure board not covered by the rib supporting plate. When the pressure board is not to be provided with covering material 56, the flange 54 preferably is omitted.

As is most clearly shown by Figs. 7 and 8, the upper terminal edges of both the pressure board and plate 46, are provided with a series of rib guides which may be in the form of coinciding detents or cut-outs 57 and 58. Each rib has formed at its upper end a hook portion 59 which is adapted to receive therein the base edges 60 and 61 of each detent 57 and 58. Any suitable means may be provided for maintaining the hooks in position, there being shown, as exemplary of such means, a pin or rod 62 which enters perforations 63 and 64 in the pressure board and rib supporting plate, respectively.

In order that the pin may not become disassociated from the pressure board and misplaced, or lost, a chain or the like may be employed as shown.

Any suitable means, such as screws, rivets or the like 65, may be utilized for fixing each rib to the plate 46.

In this form of the device, it is plainly evident that the operator of the machine, upon desiring to change the size or number of dough divisions, need only remove the pin 62 and then lift the rib-carrying unit or plate bodily upwardly from its position upon the pressure board, whereupon he may replace the unit or plate with another one having a greater or fewer number of ribs such as 47. The pressure board 45, therefore, need never be removed except for cleaning or possible repairs. The creasing ribs 47 have all the physical characteristics of the creasing ribs of Figs. 1 to 5 inclusive, with the addition of the hook portion above referred to.

Like the creasing and dividing ribs of Figs. 1 to 5, those illustrated in Figs. 6 to 8 include severing blades or cutter elements 48. These blades may rest within grooves 67 formed in the upper terminal ends of the ribs, and each preferably has an elongated perforation 68 for reception of a screw or the like 69 which clamps the blade between the confining side walls of the groove. An adjusting screw 70, threaded into the material of the hook portion, impinges upon the back of the blade at 71, so as to provide a means for advancing the blade to adjusted positions relative to the drum surface 44 while the lock screw 69 is in a loosened or partially loosened condition. It is to be understood that the adjustment means 70 is only illustrative of one practical means for adjusting the blade. Each of the series of adjacent blades 47 is constructed in the manner illustrated in Fig. 6.

It is to be understod that various modifications and changes in structural details of the device may be made, within the scope of the appended claims, without departing from the spirit of the present invention.

What is claimed is:

1. In a device of the class described the combination of a molder drum having a curved outer surface, a pressure board having approximately the same curvature as the said drum surface and arranged in spaced relation therewith, and load creasing and severing means carried by the pressure board, said creasing and severing means comprising a tapering curved rib having a decidedly rounded top edge incapable of puncturing the skin of a molded loaf, a sharpened cutting element fixed relative to the rib and adapted to cut the loaf at the crease formed by the rounded top edge of the rib, and adjusting means for said element disposed wholly within the circle arc which defines the pressure board.

2. In a device of the class described the combination of a molder drum having a curved outer surface, a pressure board having approximately the same curvature as the said drum surface and arranged in spaced relation therewith, a slotted loaf creasing rib fixed upon the inner face of the pressure board, a cutting element, and means for adjustably fixing the cutting element within the slot of the rib, whereby the pressure board, the rib and the cutting element and its adjusting means, are removable and replaceable as a unit with respect to the molder drum.

3. In a device of the class described the combination of a molder drum having a curved outer surface, a pressure board having approximately the same curvature as the said drum surface and arranged in spaced relation therewith, loaf creasing and severing means carried by the pressure board, said creasing and severing means comprising a tapering rib having a decidedly rounded top edge incapable of puncturing the skin of a molded loaf, a sharpened cutting element adapted to cut the loaf at the crease formed by the rounded top edge of the rib, means for fixing the cutting element upon the rib and means for adjusting the cutting element thereon.

4. In a device of the class described the combination of a molder drum having a curved outer surface, a pressure board having approximately the same curvature as the said drum surface and arranged in spaced relation therewith, a loaf creasing rib having a slotted end said rib being secured to the curved inner surface of the pressure board with the slotted end thereof disposed upon the pressure board near an edge of the pressure board, a cutting element fixed in the slot of the rib so that it may rest upon the pressure board, and screw means threaded in the material of the pressure board and extending therethrough for abutting the cutting element and moving it toward and from the pressure board, and means for locking the cutting element in adjusted positions.

5. In a device of the class described the combination of a molder drum having a curved outer surface, a pressure board having approximately the same curvature as the said drum surface and arranged in spaced relation therewith, a loaf creasing rib having a slotted end said rib being secured to the curved inner surface of the pressure board with the slotted end thereof disposed near an edge of the pressure board, a cutting element fixed in the slot of the rib and screw means threaded in the material of the pressure board and extending therethrough for abutting the cutting element and moving it toward and from the pressure board.

6. As a new article of manufacture a pressure board for dough working machinery, said pressure board having a removable section of a width approximating the width of the pressure board and provided with parallel longitudinal loaf creasing ribs, means for securing said section to the board so as to cover part of the length of the board from one side edge thereof to the other side edge, and a cutting element fixed at an end of each rib.

7. As a new article of manufacture an arcuate pressure board for dough working machinery, said pressure board having a removable creasing section of a width approximating the width of the pressure board, means for securing said section upon the board so as to cover part of the length of the board from one side edge thereof to the other side edge, and a creasing means carried by the removable section and comprising a tapered arcuate rib having a decidedly rounded creasing edge.

8. As a new article of manufacture an arcuate pressure board for dough working machinery, said pressure board having a removable creasing section of a width approximating the width of the pressure board, means for fixing said section to the board so as to cover part of the length of the board from one side edge thereof to the other side edge, a creasing means carried by the board and comprising a tapered arcuate rib having a decidedly rounded creasing edge, and a sharpened cutting edge provided adjacent to the rounded creasing edge and fixed at one end of the rib.

9. As a new article of manufacture a pressure board for dough working machinery, said pressure board comprising a molding section and a creasing section, a creasing means carried by the board and comprising a tapered slotted rib having a decidedly rounded creasing edge, the slot of the rib being disposed at one end of the rib and extending from the end inwardly to provide spaced parrallel walls, a sharpened cutting element supported between said spaced walls and having its sharpened edge extending outwardly of the rib contour, while its back edge extends toward the pressure board no farther than the rib, means for securing the rib to the pressure board, and means confined within the limits of the rib and the pressure board for varying the position of the cutting element with respect to the creasing edge of the rib.

10. As a new article of manufacture a pressure board for dough working machinery, said pressure board comprising a molding section and a creasing section, a creasing means carried by the board and comprising a tapered slotted rib having a decidedly rounded creasing edge, the slot of the rib being disposed at one end of the rib and extending from the end inwardly to provide spaced parallel resilient walls, a sharpened cutting element supported between said spaced walls and having its sharpened edge extending outwardly of the rib contour, means for securing the rib to the pressure board, adjusting means carried by the pressure board for varying the position of the cutting element with respect to the creasing edge of the rib, and means for contracting the spaced resilient walls of the rib upon the interposed cutting element to frictionally bind the cutting element between said walls.

11. As a new article of manufacture a pressure board for dough working machinery, said pressure board comprising a molding section and a creasing section, a creasing means carried by the board and comprising a tapered slotted rib having a decidedly rounded creasing edge, the slot of the rib being disposed at one end of the rib and extending from the end inwardly to provide spaced parallel resilient walls, a sharpened cutting element supported between said spaced walls and having its sharpened edge extending outwardly of the rib contour, means for securing the rib to the pressure board, adjusting means carried by the pressure board for varying the position of the cutting element with respect to the creasing edge of the rib and means including a clamping screw arranged transversely of the slot of the rib and passing through the cutting element for securing the cutting element against displacement from its adjusted positions.

12. As a new article of manufacture a pressure board for dough working machinery having a transverse flange strip secured to the working face of the board and providing a receptive channel for a plate and an opposed receptive channel for a cover sheet.

13. In combination a pressure board for dough working machinery, a creasing rib unit comprising a plate of substantially the width of the pressure board shaped to cover part of the pressure board, and a series of creasing ribs each of which is fixedly mounted upon the plate in substantial parallelism, and means for detachably securing the creasing rib unit, including the plate, bodily upon the pressure board.

14. As a new article of manufacture a pressure board element for use with dough molding apparatus having side flanges, said pressure board element being in the form of a plate having opposite sides, and walls bounding said opposite sides to preclude contact of dough masses upon the side flanges of the molding apparatus, said walls having inner surfaces inclined at an obtuse angle to the pressure board for rolling dough loaf ends without tearing and rupturing the skin thereof.

15. In a device of the class described the combination of a molder drum having a curved outer surface, a pressure board having approximately the same curvature as the said drum surface and arranged in spaced relation therewith, and a creasing and severing unit detachably supported upon the inner concave surface of the pressure board, said unit being constituted of a separate plate having a curvature corresponding to that of the pressure board, and creasing ribs secured to the separate plate in spaced relationship.

16. In a device of the class described the combination of a molder drum having a curved outer surface, a pressure board having approximately the same curvature as the said drum surface and arranged in spaced relation therewith, a creasing and severing unit detachably supported upon the inner concave surface of the pressure board, said unit being constituted of a separate plate having a curvature corresponding to that of the pressure board, creasing ribs secured to the separate plate in spaced relationship, and means for detachably securing the rib carrying plate in abutment upon the pressure board to preclude relative shifting of the plate and pressure board.

17. In a device of the class described the combination of a dough molding element having a dough pressing surface, a pressure board arranged in spaced relation with said pressing surface, and a dough creasing and severing unit detachably supported upon the pressure board adjacent to the pressing surface of the dough molding element, said unit being constituted of a separate bodily removable plate, and creasing ribs secured to the plate, and means for detachably holding the bodily removable rib-carrying plate against movement relative to the pressure board.

WILLIAM G. KIRCHHOFF.